G. A. N. WAHLEN.
SCALE CHECK.
APPLICATION FILED JAN. 24, 1916.
1,225,085.
Patented May 8, 1917.
3 SHEETS—SHEET 2.
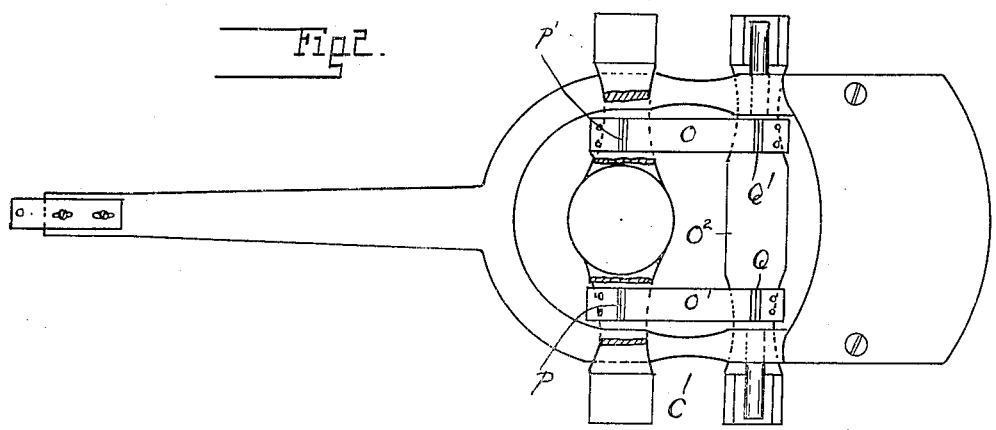
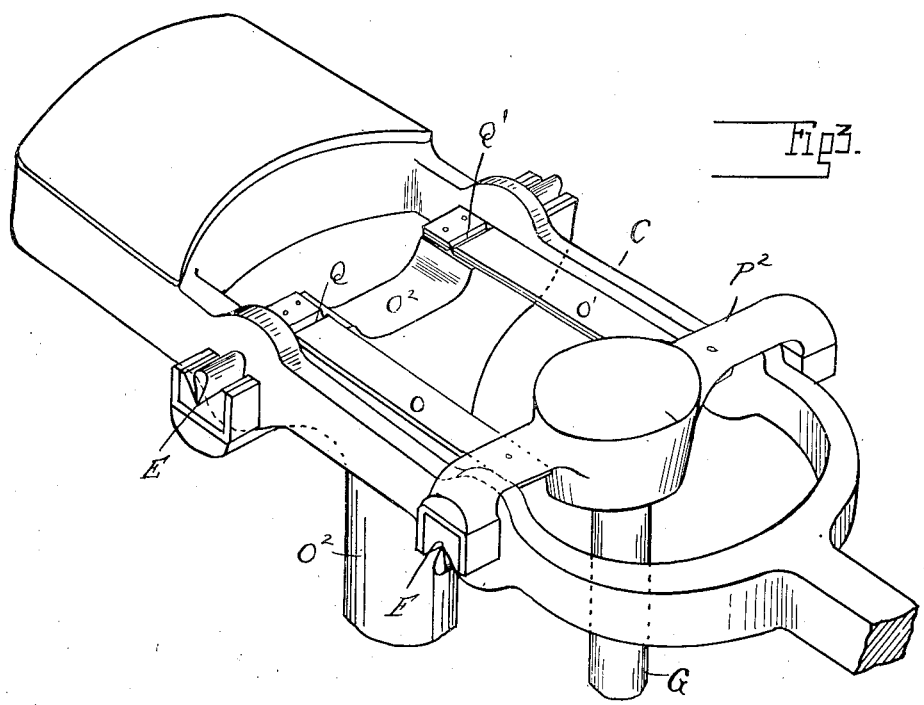
Inventor
Gustavus A. N. Wahlen
By Whittemore Hulbert & Whittemore
Attorneys

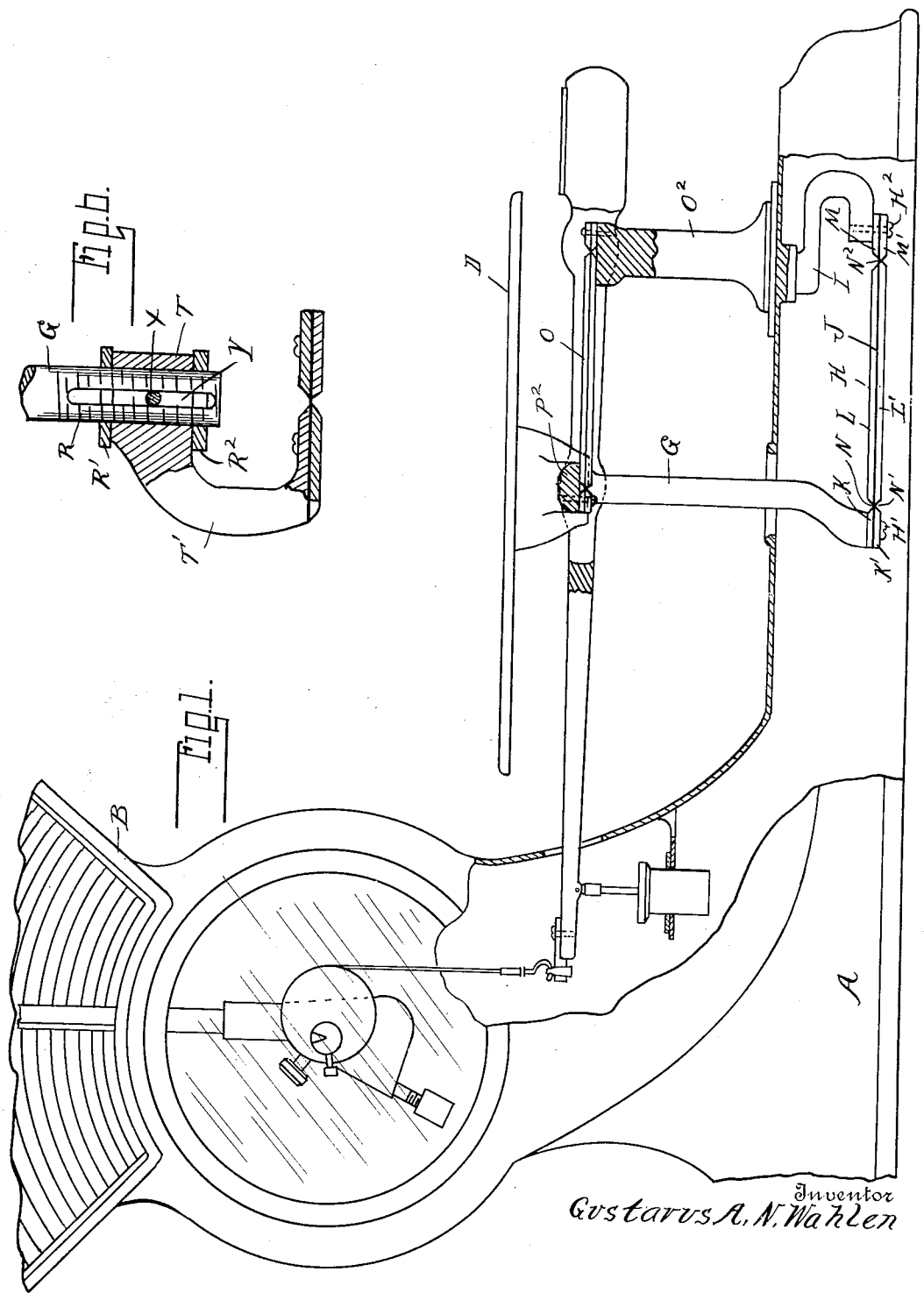

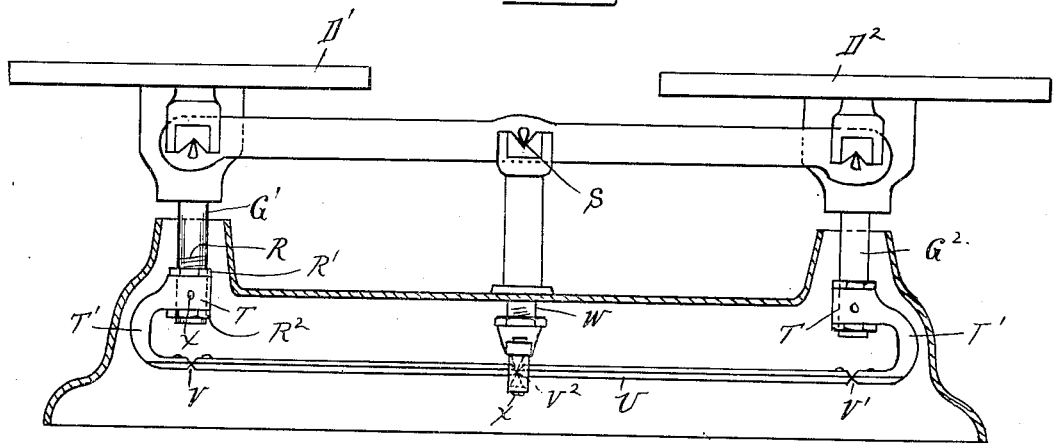
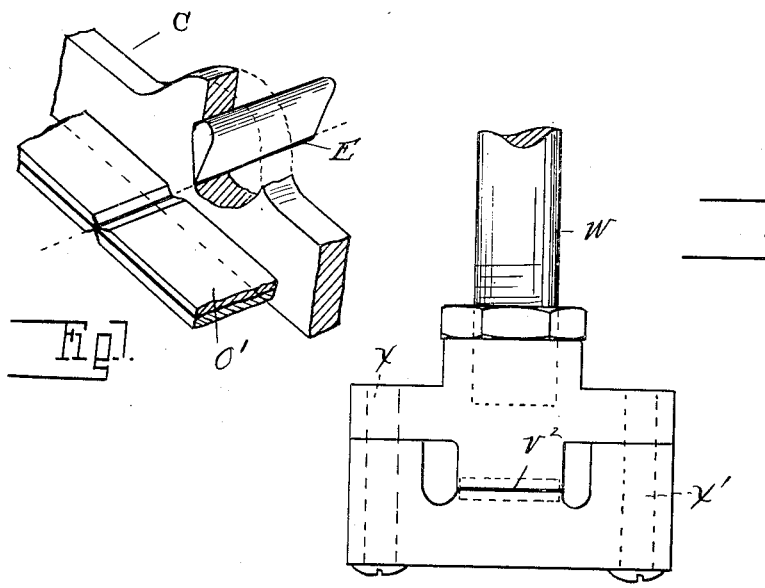
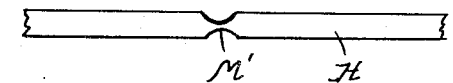

UNITED STATES PATENT OFFICE.

GUSTAVUS A. N. WAHLEN, OF ST. JOHNSBURY, VERMONT.

SCALE-CHECK.

1,225,085.  Specification of Letters Patent.  Patented May 8, 1917.

Application filed January 24, 1916. Serial No. 73,806.

*To all whom it may concern:*

Be it known that I, GUSTAVUS A. N. WAHLEN, a citizen of the United States of America, residing at St. Johnsbury, in the county of Caledonia and State of Vermont, have invented certain new and useful Improvements in Scale-Checks, of which the following is a specification, reference being had therein to the accompanying drawings.

This invention relates to scale checks and more particularly to a scale check adapted for effective use in scales of the two-point bearing type. The invention has among its objects to provide an improved scale check which will insure greater accuracy in weighing than is possible with the old style pin or other checks commonly used in this type of scale.

Other salient objects of the invention are to provide a construction of scale check which can be clamped in position and will remain at all times constant, that is—the point of flexing will always remain the same; to provide a construction in which there is no lost motion and the tendency to shift about as is the case where pin checks are used, is avoided; to provide a construction in which the scale check can be constructed in the form of a steel, bronze or other pliable tape or thin metal member rigidly attached to the mechanism; to provide adequate means for adjusting the check mechanism so that the parallelogram can be completed, which arrangement is necessary in order to have a two-point bearing scale weigh correctly; to provide an improved check which will allow the spindle free axial movement but rigidly resist sidewise deflection in any direction; to so construct and arrange the flexible check tape that it offers no material resistance to the load and does not perform any function as a weighing part; to provide a construction in which there can be no side play or end play of the check and the parallelogram cannot shift from its fixed position; to provide a construction in which a plurality of checks can be placed with their bending portion in line with the pivots for the parallel or yoke holding the pan, thus effectively preventing the parallel from shifting sidewise along its pivots; to avoid the use of the points of the pivots as a friction against the caps, thereby eliminating unnecessary wear on the knife-edges; and in general, to provide a construction which can be economically manufactured and assembled and which will more accurately perform its functions than scale checks now in use.

The invention further resides in such features of construction and arrangement and combination of parts as will hereinafter appear.

In the drawings,—

Figure 1 is a side elevation partly in section of a scale embodying my invention;

Fig. 2 is an enlarged plan view showing the arrangement of the upper checks;

Fig. 3 is a perspective view of the parallel yoke for the pan or platform;

Fig. 4 is a side elevation partly in section of a double platform type of scale embodying my invention;

Fig. 5 is an enlarged elevational sectional view through the hanger or check-post shown in Fig. 4.

Fig. 6 is a detail view of one of the adjusting mechanisms;

Fig. 7 is an enlarged perspective, partly in section, showing the alinement of the check with the knife-edge pivots.

Fig. 8 is a side elevation showing a modified construction of check.

Referring first in detail to the construction shown in Figs. 1, 2 and 3, A designates the platform base upon one end of which is supported the indicating or computing mechanism B, while positioned above the central portion of the base is a parallel yoke C supported by two-point bearings E and F respectively. In each of the embodiments of my invention shown and described, the scale is of the well known two-point bearing type, and in this type of scales, in order to obtain a correct weighing, it is necessary that the parallelogram, when once completed, shall be maintained. My invention especially relates to the construction and arrangement of the check or checks which keep the parallelogram constant at all times, and prevents inaccuracies caused by undue friction on the knife-edge pivots.

Describing first in detail, the check which is connected to the lower end of the spindle G, which spindle is actuated by the load placed on the pan or platform plate D, it will be noticed that the check H is rigidly clamped by screws H' H² to the lower end of the spindle G and the stud or check-post I. The check member H preferably comprises a steel, bronze or other resilient strip J upon opposite sides of which are clamped pairs of bars K K', L L' and M M'. These bars extend longitudinally of the strip and have their adjacent ends provided with bevels N, thus leaving short portions N' N² of the flexible band J which are not reinforced. Therefore, upon downward movement of the spindle G, the check strip will flex about the points N' n², the strip being sufficiently thin to offer no substantial resistance to the axial movement of the spindle. However, owing to the rigidity of the reinforced bars, and the rigid connections at the ends of the check, any sidewise deflection of the supporting spindle will be prevented. Also in place of the built-up check member, the flexible portions N' N² might be located between integrally formed thickened portions.

Positioned in the line of the knife-edge pivots E and F is a pair of similarly formed check members O and O' which serve to hold the parallelogram from sidewise movement and to prevent any undue friction being placed upon the knife points. Heretofore it has been common to depend upon the friction of the pivotal members with the cap, to prevent the sidewise displacement of the pivots, but in the present construction I avoid this unnecessary wear upon the knife-edge pivots by the employment of the flexible check strips O O' extending between the fulcrum stand O² and the yoke P², as shown in Fig. 3. Since these strips are located in the horizontal plane of the pivots and their freely flexible portions P P' and Q Q' are located in the vertical planes of the pivot, the check strips will in no way interfere with the proper rocking of the pivots on their seats. In case the load is placed at one side of the center of the pan, the checks O and O' will relieve the friction which would otherwise be placed on the knife-edge pivots, the elimination of the friction at the pivotal points insuring greater accuracy than is possible without the use of such checks.

In the modified construction shown in Figs. 4 and 5, a pair of pans or platforms D' D² are mounted upon opposite sides of the central knife-edge pivot S. The post G' which supports the pan D' and the post G² which supports the pan D² have their lower ends connected to the check member U. This check member is similar in construction to that described in connection with Figs. 1 to 3, and is provided near its ends with the freely flexible portions V V', but in addition thereto has a freely flexible portion V² at the point where it passes through the hanger or check post W, which depends from the frame substantially in the line of the central pivot S. The check strip U is clear upon the sides, but as shown in detail in Fig. 5, is clamped at the center by means of screws X X'. The operation of the double fulcrum scale, as far as the checks are concerned, is similar to that of the single fulcrum scale, in each case the check being freely flexible at fixed points so as to permit the vertical reciprocation of the pan spindle, while at all times maintaining the parallelogram in fixed relation.

Suitable means for adjusting the connection between the spindle and the check plate, so as to complete the parallelogram, are shown in detail in Fig. 6. The lower end of the pan or platform-supporting spindle G is provided with screw threads R upon which are lock-nuts R' R² arranged upon opposite sides of the sleeve T which carries the arm T' for connecting with the check strip. This sleeve is preferably provided with a guide-pin X extending through a longitudinal slot Y in the pan-supporting spindle, so that longitudinal adjustment can be made while at the same time the sleeve is held from circumferential movement relative to the pan-supporting spindle. From the foregoing description it is obvious that by a simple and novel arrangement of parts I effectively secure the various objects of the invention. Changes, however, can be made in the details of construction and arrangement of parts, without departing from the scope of my invention.

What I claim as my invention is:—

1. In a scale, the combination with a pan or platform, of a spindle therefor, a fixed bearing and a check member operatively connected to said spindle and bearing, said check member being formed of resilient metal and having portions reinforced by substantially non-resilient members to localize the point or points of flexibility.

2. In a scale, the combination with a pan or platform, of a spindle therefor, and a check member having one end rigidly clamped to the spindle and its opposite end rigidly clamped from endwise movement, said check member comprising a metal strip having substantially non-flexible bars secured thereto to prevent flexing of the strip at other than predetermined points.

3. In a scale, the combination with a pan or platform, of a spindle therefor, and a check member for preventing lateral displacement of the spindle while permitting vertical adjustment thereof, said check member comprising a strip of flexible metal having one end fixedly secured from movement and its opposite end fixedly secured to said spindle, and bars secured to said flexible strip and extending longitudinally thereof, the adjacent ends of said bars being reversely tapered and said bars preventing the flexing of the tape except at points intermediate the tapered ends of the bars.

4. In a scale, the combination with a fulcrum stand, of a lever, a pan or platform having a spindle and operatively connected to said lever, said lever having a yoke mounted on knife-edge pivots, and parallelly-arranged check members formed of resilient strips and each having one end clamped to said yoke and its opposite end clamped to said fulcrum stand.

5. In a scale, the combination with a fulcrum stand, of a lever, a pan or platform having a spindle and operatively connected to said lever, said lever having a yoke mounted on knife-edge pivots, and parallelly-arranged check members formed of resilient strips and each having one end clamped to said yoke and its opposite end clamped to said fulcrum stand, said strips being reinforced to prevent their flexing at points out of alinement with the knife-edge pivots.

6. In a scale, the combination with a fulcrum stand, of a yoke mounted on knife-edge pivots, a pan or platform having a spindle and operatively connected to said yoke, parallelly-arranged check members formed of resilient strips and each having one end clamped to said yoke and its opposite end clamped to said fulcrum stand, a vertically adjustable spindle operatively connected to said yoke, and a check member connected to said spindle and adapted to prevent lateral displacement while permitting vertical movement thereof.

7. A check for scales, comprising a check member adapted to flex when its ends are rigidly connected to relatively movable members, said check member having a thin portion located between longitudinally-arranged thickened portions so as to prevent flexing at other than the thin portion.

8. In a scale, the combination with a yoke supported on knife-edge pivots, of a load supporting member operatively connected to said yoke, and means for preventing undue friction on the knife-edge pivots when the load is positioned off the center of the supporting member, said means comprising a flexible check member having one end fixed from movement and its opposite end rigidly secured to said yoke, and said check member being held from flexing at points out of alinement with the knife-edge pivots.

In testimony whereof I affix my signature in presence of two witnesses.

GUSTAVUS A. N. WAHLEN.

Witnesses:
 ELIJAH YORKE,
 ADAM C. BURKHEISER.